United States Patent
Amanullah et al.

(10) Patent No.: US 10,392,549 B2
(45) Date of Patent: *Aug. 27, 2019

(54) DATE TREE TRUNK-BASED FIBROUS LOSS CIRCULATION MATERIALS

(71) Applicant: Saudi Arabian Oil Company, Dhahran (SA)

(72) Inventors: Md Amanullah, Dhahran (SA); Jothibasu Ramasamy, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 56 days.

This patent is subject to a terminal disclaimer.

(21) Appl. No.: 15/658,895

(22) Filed: Jul. 25, 2017

(65) Prior Publication Data

US 2018/0057729 A1 Mar. 1, 2018

Related U.S. Application Data

(60) Provisional application No. 62/382,012, filed on Aug. 31, 2016.

(51) Int. Cl.
*C09K 8/035* (2006.01)
*C09K 8/06* (2006.01)
(Continued)

(52) U.S. Cl.
CPC .............. *C09K 8/035* (2013.01); *C09K 8/06* (2013.01); *C09K 8/145* (2013.01); *C09K 8/506* (2013.01);
(Continued)

(58) Field of Classification Search
None
See application file for complete search history.

(56) References Cited

U.S. PATENT DOCUMENTS 2,483,936 A 10/1949 Roberts
2,600,404 A 6/1952 Hoeppel
(Continued)

FOREIGN PATENT DOCUMENTS

CN 101311243 A 11/2008
CN 101560084 A 10/2009
(Continued)

OTHER PUBLICATIONS

International Search Report and Written Opinion for International Application No. PCT/US2016/062130 (SA5410/PCT); dated Jan. 27, 2017 (pp. 1-12), (Continued)

*Primary Examiner* — John J Figueroa
(74) *Attorney, Agent, or Firm* — Bracewell LLP; Constance G. Rhebergen; Brian H. Tompkins

(57) ABSTRACT

A date tree trunk-based lost circulation material (LCM) is provided. The date tree trunk LCM includes date tree trunk fibers produced from date tree trunks. The date tree trunks may be obtained from the date tree waste produced by the processing of date trees in the production of date fruits. The date tree trunk LCM may include fibers having lengths less than 8 millimeters (5 mm) and having an aspect ratio range of 10 to 15. Methods of lost circulation control using a date tree trunk LCM and manufacture of a date tree trunk LCM are also provided.

8 Claims, 1 Drawing Sheet

(51) Int. Cl.

| | | |
|---|---|---|
| C09K 8/14 | (2006.01) | |
| D21B 1/06 | (2006.01) | |
| C09K 8/506 | (2006.01) | |
| C09K 8/516 | (2006.01) | |

(52) U.S. Cl.
CPC .............. *C09K 8/516* (2013.01); *D21B 1/063* (2013.01); *C09K 2208/08* (2013.01)

(56) References Cited

U.S. PATENT DOCUMENTS

| | | | |
|---|---|---|---|
| 2,749,308 | A | 6/1956 | Beckum et al. |
| 2,779,417 | A | 1/1957 | Clark, Jr. et al. |
| 2,789,948 | A | 4/1957 | Tronolone |
| 2,811,488 | A | 10/1957 | Nestle et al. |
| 2,912,380 | A | 11/1959 | Groves |
| 2,943,679 | A | 7/1960 | Scott, Jr. |
| 2,943,680 | A | 7/1960 | Scott et al. |
| 3,147,127 | A | 9/1964 | Shannon |
| 4,086,098 | A | 4/1978 | Le Ruyet et al. |
| 4,110,225 | A | 8/1978 | Cagle |
| 4,127,548 | A | 11/1978 | Alexander |
| 4,275,788 | A | 6/1981 | Sweatman |
| 4,619,772 | A | 10/1986 | Black et al. |
| 5,004,553 | A | 4/1991 | House et al. |
| 5,118,664 | A | 6/1992 | Burts, Jr. |
| 5,197,324 | A | 3/1993 | Keys |
| 5,332,724 | A | 7/1994 | Burts, Jr. |
| 5,484,028 | A | 1/1996 | Rose |
| 5,501,275 | A | 3/1996 | Card et al. |
| 5,801,127 | A | 9/1998 | Duhon, Sr. |
| 6,016,879 | A * | 1/2000 | Burts, Jr. .............. C09K 8/035 166/295 |
| 6,098,712 | A | 8/2000 | Burts, Jr. |
| 6,102,121 | A | 8/2000 | Burts, Jr. |
| 6,271,001 | B1 | 8/2001 | Clarke et al. |
| 6,350,594 | B1 | 2/2002 | Clarke et al. |
| 6,518,224 | B2 | 2/2003 | Wood |
| 6,716,798 | B1 | 4/2004 | Burts, Jr. |
| 6,750,179 | B1 | 6/2004 | Burts, Jr. |
| 6,790,812 | B2 | 9/2004 | Halliday |
| 6,806,232 | B1 | 10/2004 | Cart |
| 6,814,798 | B2 | 11/2004 | Vijn et al. |
| 6,861,392 | B2 | 3/2005 | Shaarpour |
| 6,932,158 | B2 | 8/2005 | Burts |
| 7,226,895 | B2 | 6/2007 | Xiang |
| 7,271,131 | B2 | 9/2007 | Halliday et al. |
| 7,284,611 | B2 | 10/2007 | Reddy et al. |
| 7,297,662 | B2 | 11/2007 | Verret |
| 7,297,663 | B1 | 11/2007 | Kilchrist et al. |
| 7,332,026 | B2 | 2/2008 | Fyten et al. |
| 7,488,705 | B2 | 2/2009 | Reddy et al. |
| 7,507,692 | B2 | 3/2009 | Xiang |
| 7,537,054 | B2 | 5/2009 | Reddy et al. |
| 7,629,297 | B2 | 12/2009 | Shaarpour |
| 7,744,689 | B2 | 6/2010 | Hojaji et al. |
| 7,902,126 | B1 | 3/2011 | Burts, Jr. |
| 7,923,413 | B2 | 4/2011 | Ghassemzadeh |
| 7,964,537 | B2 | 6/2011 | Rayborn, Sr. et al. |
| 8,371,381 | B2 | 2/2013 | Shindgikar et al. |
| 8,383,558 | B2 | 2/2013 | Reddy et al. |
| 8,404,622 | B2 | 3/2013 | Ghassemzadeh |
| 8,673,825 | B2 | 3/2014 | Rayborn, Sr. et al. |
| 8,739,872 | B1 | 6/2014 | Miller et al. |
| 8,776,882 | B2 | 7/2014 | Shindgikar et al. |
| 8,887,808 | B2 | 11/2014 | Kumar et al. |
| 8,935,957 | B2 | 1/2015 | Kulkarni et al. |
| 8,992,670 | B1 | 3/2015 | Vohra |
| 9,140,118 | B2 | 9/2015 | Kulkarni et al. |
| 9,175,529 | B2 | 11/2015 | Jamison et al. |
| 9,376,607 | B2 | 6/2016 | James |
| 9,410,066 | B2 | 8/2016 | Ghassemzadeh |
| 9,416,306 | B2 | 8/2016 | Savari et al. |
| 9,453,156 | B2 | 9/2016 | Wu |
| 9,505,659 | B2 | 11/2016 | Bickbau |
| 9,592,488 | B2 | 3/2017 | Yusuf et al. |
| 9,623,067 | B1 | 4/2017 | Awad et al. |
| 9,688,901 | B2 | 6/2017 | Fontenot |
| 9,783,727 | B2 | 10/2017 | Lahman et al. |
| 2002/0010100 | A1 | 1/2002 | Wood |
| 2004/0023813 | A1 | 2/2004 | Burts, III |
| 2004/0129460 | A1 | 7/2004 | MacQuoid et al. |
| 2004/0244978 | A1 | 12/2004 | Shaarpour |
| 2005/0113260 | A1 | 5/2005 | Wood |
| 2005/0124502 | A1 | 6/2005 | Shaarpour |
| 2005/0217852 | A1 | 10/2005 | Bennett et al. |
| 2006/0106136 | A1 | 5/2006 | Abu-Sharkh |
| 2006/0122069 | A1 | 6/2006 | Burts, III |
| 2006/0157247 | A1 | 7/2006 | Burts, III |
| 2006/0160907 | A1* | 7/2006 | Stamp .................. C05F 5/002 516/100 |
| 2009/0054269 | A1 | 2/2009 | Chatterji et al. |
| 2009/0286697 | A1 | 11/2009 | Shaarpour |
| 2009/0305038 | A1 | 12/2009 | Duran et al. |
| 2009/0305911 | A1 | 12/2009 | Pomerleau |
| 2010/0152070 | A1 | 6/2010 | Ghassemzadeh |
| 2010/0181110 | A1 | 7/2010 | Harr |
| 2010/0193244 | A1 | 8/2010 | Hoskins |
| 2010/0230164 | A1 | 9/2010 | Pomerleau |
| 2010/0230169 | A1 | 9/2010 | Pomerleau |
| 2011/0214870 | A1 | 9/2011 | Shaarpour |
| 2011/0278006 | A1 | 11/2011 | Sanders |
| 2012/0157354 | A1 | 6/2012 | Li et al. |
| 2012/0247763 | A1 | 10/2012 | Rakitsky et al. |
| 2013/0025863 | A1* | 1/2013 | Lin .................. C09K 8/5083 166/294 |
| 2014/0038857 | A1 | 2/2014 | Miller et al. |
| 2014/0102987 | A1 | 4/2014 | Yusuf et al. |
| 2014/0110177 | A1 | 4/2014 | Harr |
| 2014/0135237 | A1 | 5/2014 | Villarreal, Jr. et al. |
| 2014/0209290 | A1 | 7/2014 | Jamison et al. |
| 2014/0231082 | A1 | 8/2014 | Jamison et al. |
| 2014/0262281 | A1 | 9/2014 | Kulkarni et al. |
| 2014/0318793 | A1 | 10/2014 | Van Petergem et al. |
| 2014/0353043 | A1 | 12/2014 | Amanullah et al. |
| 2015/0051120 | A1 | 2/2015 | Hurd et al. |
| 2015/0072901 | A1 | 3/2015 | Samuel et al. |
| 2015/0166875 | A1 | 6/2015 | Bird et al. |
| 2015/0247081 | A1 | 9/2015 | Dillon et al. |
| 2015/0251156 | A1 | 9/2015 | Yusuf et al. |
| 2016/0060985 | A1 | 3/2016 | Lin et al. |
| 2016/0096988 | A1 | 4/2016 | Lin et al. |
| 2016/0177164 | A1 | 6/2016 | Dillon et al. |
| 2016/0222274 | A1 | 8/2016 | Hoskins |
| 2016/0222275 | A1 | 8/2016 | Galindo et al. |
| 2016/0257869 | A1 | 9/2016 | Kulkarni et al. |
| 2016/0264839 | A1 | 9/2016 | Mata et al. |
| 2016/0289528 | A1 | 10/2016 | Wagle et al. |
| 2016/0312100 | A1 | 10/2016 | Amanullah et al. |
| 2017/0058180 | A1 | 3/2017 | Hossain et al. |
| 2017/0137688 | A1 | 5/2017 | Amanullah |
| 2017/0166795 | A1 | 6/2017 | Walker et al. |
| 2017/0298263 | A1 | 10/2017 | Amanullah |
| 2018/0002588 | A1 | 1/2018 | Amanullah |
| 2018/0002589 | A1 | 1/2018 | Amanullah |
| 2018/0016483 | A1 | 1/2018 | Amanullah |
| 2018/0057729 | A1 | 3/2018 | Amanullah |

FOREIGN PATENT DOCUMENTS

| | | |
|---|---|---|
| CN | 101724383 A | 6/2010 |
| CN | 102127403 A | 7/2011 |
| CN | 203035080 U | 7/2013 |
| CN | 103570298 A | 2/2014 |
| CN | 103740346 A | 4/2014 |
| CN | 104087274 A | 10/2014 |
| CN | 104419392 A | 3/2015 |
| CN | 105541159 A | 5/2016 |
| GB | 2506603 A | 4/2014 |
| JP | H0671171 A | 3/1994 |
| WO | WO2004013448 A2 | 2/2004 |
| WO | 2010019535 A2 | 2/2010 |
| WO | 2010088484 A2 | 8/2010 |
| WO | WO2010142370 A1 | 12/2010 |

(56) References Cited

FOREIGN PATENT DOCUMENTS

| WO | 2012037600 | A1 | 3/2012 |
|---|---|---|---|
| WO | 2012061187 | | 5/2012 |
| WO | 2013039938 | A1 | 3/2013 |
| WO | WO2014008598 | A1 | 1/2014 |
| WO | 2014197417 | A1 | 12/2014 |
| WO | WO2015142156 | A1 | 9/2015 |
| WO | 2015199652 | A1 | 12/2015 |
| WO | WO2016019416 | A1 | 2/2016 |
| WO | WO2016028470 | A1 | 2/2016 |
| WO | 2016172287 | A1 | 10/2016 |
| WO | 2017087434 | A1 | 5/2017 |
| WO | WO2018005575 | A1 | 1/2018 |

OTHER PUBLICATIONS

Alawad, Musaed N.J., et al.; "Superior fracture-seal material using crushed date palm seeds for oil and gas well drilling operations" Journal of King Saud University—Engineering Sciences (2017); pp. 1-7.

Al-Awad, Musaed NJ et al.; "Utilization of Shredded Waste Car Tyres as a Fracture Seal Material (FSM) in Oil and Gas Drilling Operations" Journal of Petroleum & Environmental Biotechnology, (2017) vol. 8, Issue 2; pp. 1-4.

International Search Report and Written Opinion for International Application No. PCT/US2018/034291 (SA5652/PCT); International Filing Date May 24, 2018; dated Jul. 31, 2018 (pp. 1-11).

Saudi Aramco "Local pal trees support technical solutions" Dhahran, Aug. 4, 2015; available as of Sep. 19, 2018 at the website: www.saudiaramco.com/en/home/news-media/news/local-palm-trees-support.html.

Amanullah, et al.: "Application of an indigenous eco-friendly raw material as fluid loss additive", Journal of Petroleum Science and Engineering, vol. 139, (2016) pp. 191-197.

BakerHughes.com "Soluflake Flaked Calcium Carbonate" (XP055401101) Jan. 8, 2016 (1 Page).

International Search Report and Written Opinion for International Application No. PCT/US2017/039614 (SA5532/PCT); dated Sep. 11, 2017; pp. 1-12.

International Search Report and Written Opinion for International Application No. PCT/US2017/039616 (SA5533/PCT); dated Sep. 11, 2017; pp. 1-11.

Alsaba, M. et al. "Review of lost circulation materials and treatments with an updated classification." AADE National Technical Conference and Exhibition, Houston, TX, Apr. 2014. pp. 1-9.

Wajheeuddin, M. et al. "An experimental study on particle sizing of natural substitutes for drilling fluid applications." Journal of Nature Science and Sustainable Technology 8.2 (2014): pp. 1-14.

International Search Report and Written Opinion for International Application No. PCT/US2017/067179 (SA5600/PCT) Internatioal Filing Date Dec. 19, 2017; dated Feb. 21, 2018; pp. 1-14.

International Search Report and Written Opinion for International Application No. PCT/US2017/027287 (SA5508/PCT); dated Sep. 13, 2017; 11 pages.

International Search Report and Written Opinion for International Application No. PCT/US2017/053355 (SA5580); International filing date Sep. 26, 2017; dated Jan. 17, 2018 (pp. 1-14).

International Search Report and Written Opinion for International Application No. PCT/US2017/060079 (SA5577); International Filing Date Nov. 6, 2017; dated Dec. 18, 2017 (pp. 1-14).

Amanullah "Characteristics, behavior and performance of ARC Plug-A date seed-based sized particulate LCM." SPE Kingdom of Saudi Arabia Annual Technical Symposium and Exhibition. Society of Petroleum Engineers, 2016. (pp. 1-9).

International Search Report and Written Opinion for PCT/US2017/047877 (SA5577/PCT); dated Oct. 27, 2017; 15 pages.

International Search Report and Written Opinion for International Application No. PCT/US2017/041611 (SA5534); International Filing Date Jul. 12, 2017; dated Oct. 27, 2017 (pp. 1-15).

International Search Report and Written Opinion for International Application No. PCT/US2018/048423 (SA5757); International Filing Date Aug. 29, 2018; dated Nov. 29, 2018 (pp. 1-12).

"Wood Shop News, Issue #08 Hard and softwoods, a unique food bank, and more news from around the shop" available as of Oct. 8, 2018 at the website: https://www.wooden-box-maker.com/Wood_Shop_News-hardwoods-and-softwoods.html.

* cited by examiner

DATE TREE TRUNK-BASED FIBROUS LOSS CIRCULATION MATERIALS

CROSS-REFERENCE TO RELATED APPLICATIONS

This application claims priority from U.S. Provisional Application No. 62/382,012 filed Aug. 31, 2016, and titled "DATE TREE TRUNK-BASED FIBROUS LOSS CIRCULATION MATERIALS." For purposes of United States patent practice, this application incorporates the contents of the Provisional Application by reference in its entirety.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (such as drilling mud) pumped into a well returns partially or does not fully return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well Lost circulation can occur in various formations, such as naturally fractured formations, cavernous formations, and high permeable formations. Lost circulation can be categorized by the amount of fluid or mud lost and may be categorized as seepage type, moderate type, severe type, and total loss. The extent of the fluid loss and the ability to control the lost circulation with an LCM depends on the type of formation in which the lost circulation occurs. Formations with low permeability zones, that is, those with microscopic cracks and fissures, usually have seepage type lost circulation. Other formations may experience lost circulation if an improper mud weight is used while drilling

SUMMARY

Lost circulation materials (LCMs) are used to mitigate the lost circulation by blocking the path of the drilling fluid (such as drilling mud) into the formation. The type of LCM used in a lost circulation situation depends on the extent of lost circulation and the type of formation. Different types of LCMs such as granular, fibrous and flaky materials are frequently used either alone or in combination to control loss of circulation. For example, fibrous LCMs may include cedar fibers or synthetic fibers to control loss of circulation Costs incurred in loss circulation situations may be due to losses of drilling fluids, losses of production, and the costs of LCMs, including importation of LCMs to drilling locations. Additionally, lost circulation can cause environmental problems if drilling fluids or LCMs interact with the environment surrounding the reservoir. The manufacture, use, and disposal of some conventional LCMs may pose a risk to sensitive environments, such as marine environments because they are not biodegradable and can be toxic to marine life. Additionally, the purchase and importation of LCMs to drilling locations may be expensive and time-consuming.

In one embodiment, a method to control lost circulation in a lost circulation zone in a wellbore is provided. The method includes introducing an altered drilling fluid into the wellbore such that the altered drilling fluid contacts the lost circulation zone and reduces a rate of lost circulation into the lost circulation zone. The altered drilling fluid includes a drilling fluid and a lost circulation material (LCM). The LCM includes a plurality of date tree trunk fibers produced from date tree trunks. In some embodiments, the altered drilling fluid consists of the drilling fluid and the LCM. In some embodiments, the LCM consists of the plurality of date tree trunk fibers produced from date tree trunks. In some embodiments, the plurality of date tree trunk fibers includes a plurality of untreated date tree trunk fibers. In some embodiments, the plurality of date tree trunks includes a concentration of at least 8% by weight of the total weight (w/w %) of the altered drilling fluid. In some embodiments, the reduced rate of lost circulation of a fluid portion of the altered drilling fluid is zero. In some embodiments, each of the plurality of date tree trunk fibers has a length less than 8 millimeter (mm). In some embodiments, each of plurality of date tree trunk fibers has an aspect ratio in the range of 10 to 15. In some embodiments, the drilling fluid includes a gel-polymer mud or a volcanic ash-based mud.

In another embodiment, an altered drilling fluid is provided that includes a drilling fluid and a lost circulation material (LCM). The LCM includes a plurality of date tree trunk fibers produced from date tree trunks. In some embodiments, the plurality of date tree trunk fibers includes a concentration of at least 8% by weight of the total weight (w/w %) of the altered drilling fluid. In some embodiments, the plurality of date tree trunk fibers includes a plurality of untreated date tree trunk fibers. In some embodiments, each of the plurality of date tree trunk fibers has a length less than 8 millimeter (mm). In some embodiments, each of plurality of date tree trunk fibers has an aspect ratio in the range of 10 to 15. In some embodiments, the drilling fluid includes a gel-polymer mud or a volcanic ash-based mud.

In another embodiment, a method of manufacturing a lost circulation material (LCM) is provided that includes chopping a plurality of date tree trunks to produce a plurality of chopped date tree trunks and grinding the chopped date tree trunks to produce a plurality of date tree trunk fibers, such that the LCM includes the date tree trunk fibers. In some embodiments, the method includes washing the plurality of chopped date tree trunks using water. In some embodiments, the plurality of date tree trunk fibers includes a plurality of untreated date tree trunk fibers. In some embodiments, each of the plurality of date tree trunk fibers has a length less than 8 millimeter (mm). In some embodiments, each of plurality of date tree trunk fibers has an aspect ratio in the range of 10 to 15. In some embodiments, the plurality of untreated date tree trunk fibers are not introduced to an alkali, an acid, a bleaching or an oxidation agent.

In another embodiment, a lost circulation material (LCM) composition is provided that includes a plurality of date tree trunk fibers produced from a date tree trunk. In some embodiments, the plurality of date tree trunk fibers includes a plurality of untreated date tree trunk fibers. In some embodiments, each of the plurality of date tree trunk fibers has a length less than 8 millimeter (mm). In some embodiments, each of plurality of date tree fibers has an aspect ratio in the range of 10 to 15.

DETAILED DESCRIPTION

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore, and it is this reduction or absence of returning drilling fluid that is referred to as lost circulation.

Embodiments of the disclosure include a date tree trunk LCM that includes date tree fibers formed from the trunk of a date tree to mitigate or prevent lost circulation in a well, as well as provide seepage control and minimize or prevent fluid loss. The date tree trunks may be obtained from date tree waste produced by the processing date trees (also referred to as "date palms") in the production of date fruits (also referred to as "dates"). In some embodiments, the date tree trunk LCM includes fibers having lengths of 8 millimeter (mm) or less. In some embodiments, the date tree trunk LCM includes fibers with an aspect ratio in the range of 10 to about 15. In some embodiments, the date tree trunk LCM includes fibers with an aspect ratio range of 10 or less to about 15 or greater. As used in the disclosure, the term "aspect ratio" refers to a ratio of fiber length to diameter.

Figure 1:
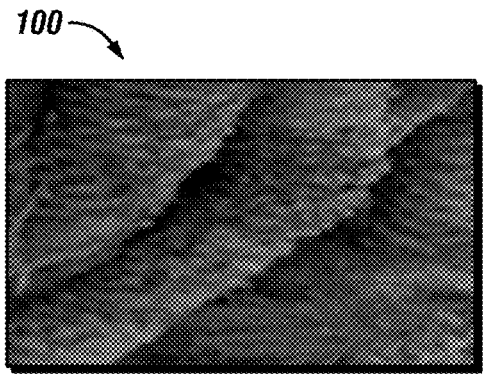
FIG. 1 is a photograph of date tree trunks in accordance with an embodiment of the disclosure.

FIG. 1 is a photograph 100 of a deceased date tree trunk in accordance with an example embodiment of the disclosure. As mentioned in the disclosure, the deceased date tree trunks may be obtained as a waste by-product from date tree processing for date fruit production. In other embodiments, the deceased date tree trunks may be obtained from any other suitable sources.

Figure 2:
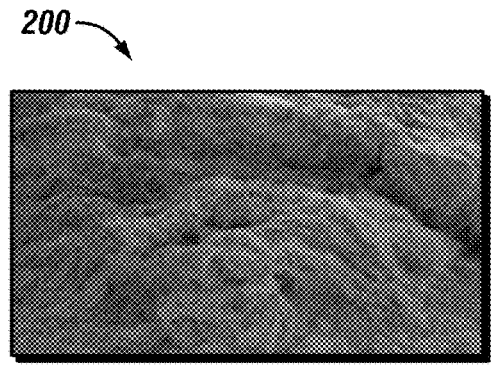
FIG. 2 is a photograph of date tree trunk fibers produced from the date tree trunks shown in FIG. 1 in accordance with an embodiment of the disclosure.

FIG. 2 is a photograph 200 of fibers produced from the date tree trunk shown in FIG. 1 and in accordance with the techniques described in the disclosure. As discussed in the disclosure, the fibers are produced by processing one or more date tree trunks to produce fibers having a specific size range (for example, length, diameter, and aspect ratio ranges). As described in the disclosure, the presence of fibers of various aspect ratios (for example, an aspect ratio range of 10 to about 15) and various mechanical properties (for example, tensile strength, flexural strength, ductility, deformability, and conformability) may enable the date tree trunk LCM to provide highly stable flow barriers to mitigate or prevent the loss of whole mud while drilling or the loss of cement slurry while cementing a well. For example, the fibers of the date tree trunk LCM may easily enter permeable and fracture loss zones under the action of overbalance pressure in drilling operations. The fibers may form a fiber network at, for example, at the mouth of fractures and gaps in a loss zone, within narrow spaces of the fractures and gaps of the loss zone, or both, and may develop a seal, plug, or other structure in the fractures and gaps to prevent or reduce the loss of drilling fluid.

As further described in the disclosure, the properties of the date tree trunk LCM may eliminate the need to use other types of LCMs for controlling fluid losses in potential loss zones. Moreover, the combination of fibers of various lengths, diameters, and aspect ratios may enable the date tree trunk LCM to seal and block fracture sizes up to about 2 mm. The date tree trunk LCM may prevent or alleviate lost circulation during drilling or cementing operations without any prior knowledge of the loss zone characteristics such as pore size, fracture size, gap size, fracture density, fracture path tortuosity, and the length.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure The following non-limiting examples of a date tree trunk LCM were prepared and evaluated using a gel-polymer mud and a Saudi Arabian volcanic ash (SAVA)-based mud. Plugging efficiency tests were conducted on the date tree trunk LCM using a 2 mm slotted disc and a Permeability Plugging Tester (also referred to as "PPT" or "Pore Plugging Test" apparatus) manufactured by OFI Testing Equipment, Inc., of Houston, Tex., USA. The tests were conducted at conditions of about 212° F. and about 500 psi differential pressure. For the plugging efficiency tests, 30 grams (g) of the date tree trunk LCM were incorporated into the gel-polymer mud and the SAVA-based mud. The compositions of the gel-polymer mud and the SAVA-based mud are shown in Table 1:

TABLE 1

| Compositions of gel-polymer mud and SAVA-based mud | | |
|---|---|---|
| Mud Component | Gel-polymer mud | SAVA-based mud |
| Water (milliliters (ml)) | 350 ml | 350 ml |
| Bentonite (g) | 25 g | N/A |
| SAVA (g) | N/A | 20 g |
| Xanthan gum (XC Polymer) (g) | N/A | 2 g |
| Psyllium Husk Powder (PHP) (g) | N/A | 2 g |

The date tree trunk LCM in the gel-polymer mud and the SAVA-based mud was tested using the Permeability Plugging Tester apparatus and the following plugging efficiency test procedure:

1. Set the temperature controller/thermostat to the testing temperature;

2. Check the condition of the O-rings in the groove at the top of the test cell of the Permeability Plugging Tester apparatus and in the cell end cap and replace the O-rings if needed;

3. Apply a thin coating of high temperature grease to all the O-rings, including the two O-rings on the piston of the Permeability Plugging Tester apparatus;

4. Screw the T-bar of the Permeability Plugging Tester apparatus into the piston, install into the bottom end of the test cell, position the piston about 1 inch into the cell bore, and remove the T-bar;

5. Add a volume of hydraulic oil to the test cell using the hydraulic hand pump of the Permeability Plugging Tester apparatus;

6. Install all the O-rings and secure the end cap of the cell in position such that oil flows from the hole in the end cap to ensure no air is trapped;

7. Install the valve stem into the bottom end cap of the cell, tighten the valve stem, and disconnect from the hydraulic hand pump of the Permeability Plugging Tester apparatus;

8. Place the cell upright on a suitable stand;

9. Pour a test sample of a homogenous mixture of 350 ml of the test mud (for example, the gel-polymer mud or the SAVA-based mud) and 30 grams of the date tree trunk LCM into the test cell;

10. Install an O-ring into the top of the cell below the 2 mm slotted disc;

11. Place the 2 mm slotted disc on top of the O-ring;

12. Insert the end cap on the top of the disc, screw down the threaded retaining ring, and fully tighten;

13. Tighten the top stem of the test cell;

14. Place the cell into the heating jacket of the Permeability Plugging Tester apparatus;

15. Connect a pressure hose from the hydraulic hand pump to the bottom of the test cell via a quick connector and ensure the bottom stem is closed;

16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve;

17. Place a thermometer into the hole at the top of the test cell. wait until the testing temperature is reached, and monitor the cell pressure while heating and bleed off pressure if necessary by opening the pressure relived valve on the side of the hydraulic hand pump;

18. Once the test sample has reached the testing temperature, pump the hydraulic hand pump until the pump gauge shows the testing pressure plus the required back pressure;

19. Apply the required back pressure to the top of the cell, open the top valve, and pump the hydraulic hand pump to reestablish the testing pressure;

20. To determine the spurt volume, collect the fluid from the back pressure collector in a measuring cylinder and record the amount, ensuring that all the fluid has been expelled;

21. Collect the fluid periodically over a 30 minute time period and check the back pressure gauge to ensure that the pressure remains less than the pressure threshold (about 3000 psi) of the built-in safety disc of the Permeability Plugging Tester apparatus and avoid expulsion of hot hydraulic oil;

22. Record the spurt loss, total leak off, and PPT values over the 30 minute time period and record the cake thickness after dismantling the test cell.

Table 2 shows the results of plugging efficiency tests for the date tree trunk LCM at a concentration of 8% by weight of the total weight (w/w %) in the gel-polymer mud and SAVA-based mud, with the spurt loss, fluid loss, total leak off, and PPT value measured in cubic centimeters (cc) and the cake thickness measured in mm:

TABLE 2

Plugging Efficiency Test Results for Date Tree Trunk LCM in Gel-polymer mud and SAVA-based mud

| Mud used with date tree LCM | Concentration of date tree trunk LCM | Spurt loss (cc) | Fluid loss (cc) | Total Leak off (cc) | Cake Thickness (mm) | PPT Value (cc) |
|---|---|---|---|---|---|---|
| Gel-polymer mud | 8 w/w % | 1 | 0 | 1 | 11.9 | 2 |
| 65 pounds per cubic foot (pcf) bentonite mud | 8 w/w % | 2 | 0 | 2 | 10 | 4 |

As shown in Table 2, at the 8% w/w concentrations of the date tree trunk LCM were effective at sealing and blocking the 2 mm slots of the slotted disc of the PPT apparatus under 500 psi differential pressure. The date tree trunk LCM controlled the loss of both the gel-polymer mud and the SAVA-based mud and exhibited negligible mud losses. The 2 mm slotted disc used in the plugging efficiency tests can represent natural or induced fracture zones. Thus, as shown by the negligible spurt loss, zero fluid loss, and negligible leak off in the gel-polymer mud and the SAVA-based mud, the 8% w/w concentration of the date tree trunk LCM demonstrated the ability to seal a potential loss zone (for example, high permeable and small fractured loss zones) quickly with a negligible loss of whole mud into the loss zone under at least a 500 psi differential pressure.

Date Tree Trunk LCM Manufacture and Use

In some embodiments, a date tree trunk LCM includes date tree fibers formed from date tree trunks. The date tree trunks may be produced as a waste by-product from date processing. For example, the date tree trunks may be obtained from date processing plants to provide a sustainable source of material for the date tree trunk LCM. Moreover, local sources of date tree trunk may reduce the cost of imported LCM products, components, or both. In some embodiments, the date tree trunks are obtained from the species *phoenix dactylifera*. It should be appreciated that, in some embodiments, the date tree trunk may be obtained from genetically modified date trees (that is, genetically modified organisms (GMOs)). In some embodiments, the date tree trunks may be prepared by cleaning the date tree trunks before processing and use as an LCM, such as by washing the date tree trunks.

In some embodiments, the date tree trunk LCM includes fibers having lengths of 8 mm or less. In some embodiments, the date tree trunk LCM includes fibers with an aspect ratio range of about 10 to about 15. In some embodiments, the date tree trunk LCM includes fibers with an aspect ratio range of 10 or less to about 15 or greater.

In some embodiments, the date tree trunks may include untreated date tree trunks, thus preserving the environmentally-friendly and biodegradable properties of the manufacturing process, the fibers formed from the date tree trunks, and the resulting LCM composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers. In such embodiments, the date tree trunk LCM may be manufactured without treating before, during, or after crushing, grinding, drying, or any other processing to form untreated fibers from the date tree trunks.

In some embodiments, the date tree trunk LCM may be added directly to a drilling fluid, such as a drilling mud, to create an altered drilling fluid having the date tree trunk LCM. For example, in some embodiments, the date tree trunk LCM may be added to (for example, blended with) an oil-based drilling mud or a water-based drilling mud. In some embodiments, the date tree trunk LCM may be added at the mud pit of a mud system. After addition of the date tree trunk LCM to a drilling fluid, the altered drilling fluid may be circulated at a pump rate effective to position the altered drilling fluid into contact with a lost circulation zone in a wellbore, such that the date tree trunk LCM alters the lost circulation zone (for example, by entering and blocking porous and permeable paths, cracks, and fractures in a formation in the lost circulation zone, such as by forming a structure in a mouth or within a fracture).

As noted in the disclosure, the mechanical properties of the date tree trunk LCM may prevent degradation of the date tree trunk LCM while enabling the date tree trunk LCM to provide highly stable flow barriers to mitigate or prevent the loss of whole mud while drilling or the loss of cement slurry while cementing a well. Moreover, the eco-friendly, non-toxic, and environmentally friendly properties of the date tree trunk LCM may minimize or prevent any environmental impact and effects on ecosystems, habitats, population, crops, and plants surrounding the drilling site where the date tree trunk LCM is used.

Figure 3:
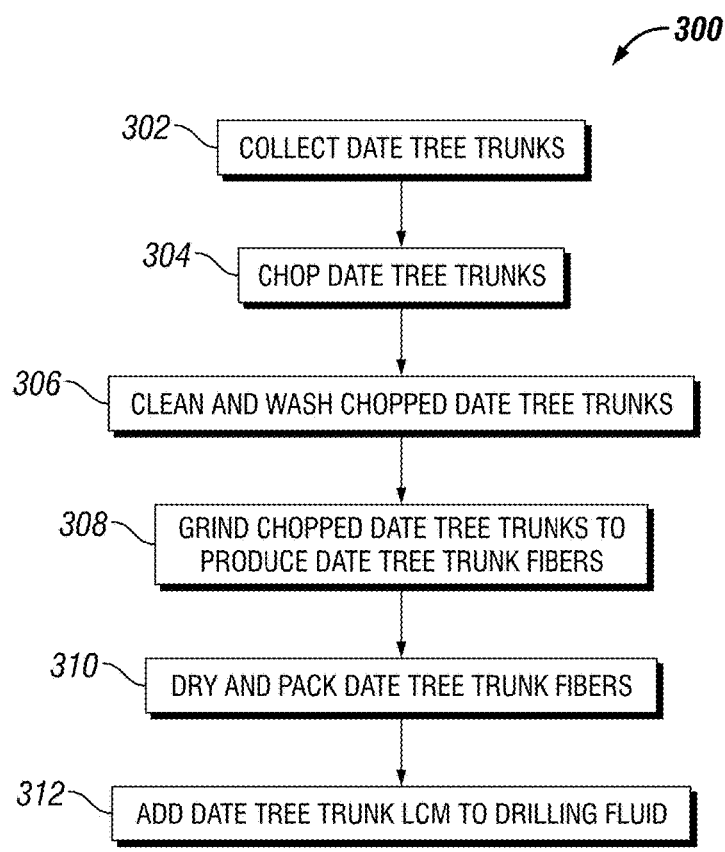
FIG. 3 is a flowchart of a process for manufacturing and using a date tree trunk LCM in accordance with an embodiment of the disclosure.

FIG. 3 depicts a process 300 for the production and use of a date tree trunk LCM in accordance with an example embodiment of the disclosure. As shown in FIG. 3, date tree trunks may be collected (block 302) from deceased date trees, such as from a date processing facility. In some embodiments, date tree trunks may be collected from a date processing facility and transported to another facility for the processing described in the disclosure. Next, the date tree trunks may be chopped into smaller pieces (block 304). For example, the date tree trunks may be chopped for subsequent ease of handling. In some embodiments, the date tree trunks may be chopped manually using a suitable chopping tool. In other embodiments, the date tree trunks may be chopped automatically via a suitable machine, such as an industrial chopper.

Next, the chopped date tree trunks may be cleaned and washed (block 306) to remove dirt, dust, and other foreign substances. In some embodiments the chopped date tree trunks may be washed using a high pressure water jet to remove dirt, dust, and other foreign substances. The chopped date tree trunks may then be ground to produce date tree trunk fibers (block 308). In some embodiments, the chopped date tree trunks may be crushed and ground using a suitable commercial grinder that produces a specific range of fiber sizes (for example, length and diameter). For example, a suitable commercial grinder may be capable of grinding the chopped date tree trunks into fibers having lengths of about 8 mm or less and with an aspect ratio in the range of about 10 to about 15. In some embodiments, the date tree trunk fibers may be ground in stages. For example, the chopped date tree trunks may be ground using a primary grinding process or grinder to produce a first range of fiber sizes. The ground date tree trunks may then be ground using a secondary grinding process or grinder to produce a second range of fiber sizes for use in the date tree trunk LCM, such as the fiber sizes described in the disclosure.

In some embodiments, the date tree trunk fibers may be dried and packed for transportation and use (block 310). For example, the date tree trunk fibers may be packed in paper bags. In some embodiments, the date tree trunk fibers may be dried using a sun drying process over a time period in atmospheric conditions. In some embodiments, a suitable amount of packed date tree trunk fibers may then be transported to an oil and gas operations site for use as a date tree trunk LCM.

In some embodiments, the date tree trunk LCM may be added directly to a drilling fluid (block 312), such as a drilling mud, to create an altered drilling fluid having the date tree trunk LCM. For example, in some embodiments, the date tree trunk LCM may be added to (for example, blended with) an oil-based drilling mud or a water-based drilling mud. In some embodiments, the date tree trunk LCM may be added at the mud pit of a mud system. After addition of the date tree trunk LCM to a drilling fluid, the altered drilling fluid may be circulated at a pump rate effective to position the drilling fluid into contact with a lost circulation zone in a wellbore, such that the date tree trunk LCM alters the lost circulation zone (for example, by entering and blocking porous and permeable paths, cracks, and fractures in a formation in the lost circulation zone). As previously stated, the date tree trunk LCM may form a fiber network at openings of paths, cracks, and fractures in a loss zone and within narrow spaces of the paths, cracks, and fractures.

In other embodiments, the date tree trunk LCM and one or more additional LCMs may be added to a drilling fluid, such as a drilling mud, to create an altered drilling fluid having the LCMs. For example, in some embodiments, the date tree trunk LCM and one or more additional LCMs may be added to an oil-based drilling mud or a water-based drilling mud. In other embodiments, the date tree trunk LCM may be added to a cement slurry for use in a cementing operation. In some embodiments, the date tree trunk LCM may be used as a component of an LCM blend or pill. For example, in some embodiments, the date tree trunk LCM may be mixed with a carrier fluid, a viscosifier, or both to form a homogenous suspension or pill. A specific carrier fluid, viscosifier, or combination therefor may be selected to form a homogenous suspension or pill having the date tree trunk LCM.

When added directly to a drilling fluid alone or added to a drilling fluid with one or more additional LCMs, the biodegradation properties of the date tree trunk fibers of the date tree trunk LCM may enable the date fruit trunk LCM to easily degrade and disappear from the environment over time and minimize or prevent any environmental impact. Further, the non-toxic properties of the date tree trunk fibers may minimize or prevent any effect on ecosystems, habitats, population, crops, and plants surrounding the drilling site where the date tree trunk LCM is used.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method to control lost circulation in a lost circulation zone in a wellbore, comprising:
   introducing an altered drilling fluid into the wellbore such that the altered drilling fluid contacts the lost circulation zone and reduces a rate of lost circulation into the lost circulation zone, where the altered drilling fluid comprises a drilling fluid and a lost circulation material (LCM), wherein the LCM comprises a plurality of date tree trunk fibers produced from date tree trunks, wherein the drilling fluid comprises a gel-polymer mud or a volcanic ash-based mud.

2. The method of claim 1, wherein the altered drilling fluid consists of the drilling fluid and the LCM.

3. The method of claim 1, wherein the LCM consists of the plurality of date tree trunk fibers produced from date tree trunks.

4. The method of claim 1, wherein the plurality of date tree trunk fibers comprise a plurality of untreated date tree trunk fibers.

5. The method of claim 1, wherein the plurality of date tree trunks comprise a concentration of at least 8% by weight of the total weight (w/w %) of the altered drilling fluid.

6. The method of claim 1, wherein the reduced rate of lost circulation of a fluid portion of the altered drilling fluid is zero.

7. The method of claim 1, wherein each of the plurality of date tree trunk fibers has a length less than 8 millimeter (mm).

8. The method of claim 1, wherein each of plurality of date tree trunk fibers has an aspect ratio in the range of 10 to 15.

* * * * *